United States Patent
Gulati et al.

(10) Patent No.: US 11,870,718 B2
(45) Date of Patent: Jan. 9, 2024

(54) SIDELINK CSI REPORT TRANSMISSION METHODS AND CONDITIONS

(71) Applicant: QUALCOMM Incorporated, San Diego, CA (US)

(72) Inventors: Kapil Gulati, Belle Mead, NJ (US); Sudhir Kumar Baghel, Hillsborough, NJ (US); Gabi Sarkis, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 17/020,707

(22) Filed: Sep. 14, 2020

(65) Prior Publication Data

US 2021/0083820 A1 Mar. 18, 2021

Related U.S. Application Data

(60) Provisional application No. 62/901,670, filed on Sep. 17, 2019.

(51) Int. Cl.
*H04L 5/00* (2006.01)
*H04B 7/06* (2006.01)

(52) U.S. Cl.
CPC .......... *H04L 5/0048* (2013.01); *H04B 7/063* (2013.01); *H04B 7/0626* (2013.01); *H04B 7/0632* (2013.01)

(58) Field of Classification Search
CPC .... H04B 7/0626; H04B 7/063; H04B 7/0632; H04B 7/0645; H04L 1/0027;
(Continued)

(56) References Cited

U.S. PATENT DOCUMENTS

2016/0050006 A1* 2/2016 Ko ............................ H04L 1/20
370/329
2018/0020429 A1* 1/2018 Aiba ...................... H04L 1/0004
(Continued)

FOREIGN PATENT DOCUMENTS

CN 110113818 A 8/2019
EP 2677671 A1 12/2013
(Continued)

OTHER PUBLICATIONS

"Support of Unicast, Groupcast and Broadcast on the NR Sidelink" 3PGG TSG-RAN WG1 Meeting #94-Bis Cheongdu, China, Oct. 2018 (Tdoc R1-1811591) (Year: 2018).*
(Continued)

*Primary Examiner* — Ian N Moore
*Assistant Examiner* — Sun Jong Kim
(74) *Attorney, Agent, or Firm* — QUALCOMM Incorporated

(57) ABSTRACT

A method for wireless communication by a first wireless device is provided. The method includes receiving one or more instances of channel state information reference signals (CSI-RS), generating CSI based on one or more of the CSI-RS instances, determining timing for transmitting the CSI based, at least in part, on at least one condition involving the CSI-RS instances, and transmitting the CSI in accordance with the determined timing.

20 Claims, 6 Drawing Sheets

(58) Field of Classification Search
CPC ... H04L 1/0057; H04L 5/0057; H04L 5/0048; H04L 5/0091; H04W 72/085
See application file for complete search history.

(56) References Cited

U.S. PATENT DOCUMENTS

| | | | |
|---|---|---|---|
| 2019/0297519 A1* | 9/2019 | Han | H04L 5/0057 |
| 2019/0379483 A1* | 12/2019 | Tang | H04B 7/0456 |
| 2020/0014430 A1* | 1/2020 | Zhang | H04B 7/0619 |
| 2020/0136787 A1* | 4/2020 | Reial | H04B 7/0695 |
| 2020/0178223 A1* | 6/2020 | Kang | H04L 5/0057 |
| 2020/0266866 A1* | 8/2020 | Takeda | H04W 72/14 |
| 2020/0374730 A1* | 11/2020 | Gao | H04L 5/0057 |
| 2020/0383119 A1* | 12/2020 | Sun | H04L 5/0092 |
| 2020/0403677 A1* | 12/2020 | Wu | H04L 5/10 |
| 2020/0403758 A1* | 12/2020 | Song | H04L 1/00 |
| 2021/0075486 A1* | 3/2021 | Song | H04B 7/0626 |
| 2021/0127387 A1* | 4/2021 | Huang | H04L 5/0087 |
| 2021/0218511 A1* | 7/2021 | Zhang | H04W 72/0466 |
| 2021/0392620 A1* | 12/2021 | Ashraf | H04L 5/005 |

FOREIGN PATENT DOCUMENTS

| | | |
|---|---|---|
| WO | 2018059318 A1 | 4/2018 |
| WO | 2018141196 A1 | 8/2018 |
| WO | 2019134099 A1 | 7/2019 |
| WO | WO-2020069879 A1 | 4/2020 |
| WO | WO-2020146580 A1 | 7/2020 |

OTHER PUBLICATIONS

U.S. Appl. No. 62/741,264, filed Oct. 4, 2018 (Year: 2018).*
Ericsson: "Support of Unicast, Groupcast and Broadcast on the NR Sidelink", 3GPP Draft, 3GPP TSG-RAN WG1 Meeting #94-Bis, R1-1811591 Ericsson—Support of UC, GC, BC, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 1, 2018, Sep. 28, 2018 (Sep. 28, 2018), XP051518989, 10 Pages, Retrieved from the Internet: URL: http://www.3gpp.org/ftp/tsg%5Fran/WG1%5FRL1/TSGR1%5F94b/Docs/R1%2D1811591%2Ezip, [retrieved on Sep. 28, 2018], p. 2, Section 2.1, p. 1, list item 2, Section 2.2.
Interdigital, Inc: "DL Signals and Channels for gNB Initiated COT", 3GPP Draft, R1-1904851, 3GPP TSG RAN WG1 #96bis, DL Signals and Channels for gNB Initiated COT, 3rd Generation Partnership Project (3GPP), Mobile Competence Centre, 650, Route Des Lucioles, F-06921, Sophia-Antipolis, Cedex, France, vol. RAN WG1, No. Xi'an, China, Apr. 8, 2019-Apr. 12, 2019, Apr. 7, 2019 (Apr. 7, 2019), XP051699998, 6 Pages, Retrieved from the Internet: URL:http://www.3gpp.org/ftp/Meetings%5F3GPP%5FSYNC/RAN1/Docs/R1%2D1904851%2Ezip [retrieved on Apr. 7, 2019], Section 2, Section 4.
International Search Report and Written Opinion—PCT/US2020/050888—ISA/EPO—dated Dec. 3, 2020.

* cited by examiner

SIDELINK CSI REPORT TRANSMISSION METHODS AND CONDITIONS

CROSS-REFERENCE TO RELATED APPLICATION(S)

This application claims benefit of and priority to U.S. Provisional Patent Application No. 62/901,670, filed Sep. 17, 2019, which is hereby incorporated by reference in its entirety.

FIELD OF THE DISCLOSURE

Aspects of the present disclosure relate to wireless communications, and more particularly, to techniques for managing channel state information (CSI) reporting between user equipments (UEs) via a sidelink channel.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

A medium access control (MAC)-control element (MAC-CE) is a MAC layer communication structure that may be used for control command exchange between wireless nodes. For example, a base station may transmit a MAC CE to a user-equipment (UE) to put the UE into a discontinuous reception (DRX) mode to reduce the UE's power consumption. The MAC-CE may be carried in a shared channel such as a physical downlink shared channel (PDSCH), a physical uplink shared channel (PUSCH), or a physical sidelink shared channel. A MAC-CE may also be used to communicate information that facilitates communication, such as information regarding buffer status and available power headroom.

SUMMARY

The systems, methods, and devices of the disclosure each have several innovative aspects, no single one of which is solely responsible for the desirable attributes.

One innovative aspect of the subject matter described in this disclosure can be implemented in an apparatus for wireless communication by a first wireless device. The apparatus generally includes a receiver configured to receive one or more instances of channel state information reference signals (CSI-RS), at least one processor configured to generate CSI based on one or more of the CSI-RS instances, determining timing for transmitting the CSI based, at least in part, on at least one condition involving the CSI-RS instances, and a transmitter configured to transmit the CSI in accordance with the determined timing.

Another innovative aspect of the subject matter described in this disclosure can be implemented in an apparatus for wireless communication by a second wireless device. The apparatus generally includes a transmitter configured to transmit one or more instances of channel state information reference signals (CSI-RS), a receiver configured to receive CSI from a first wireless device, generated based on one or more of the CSI-RS instances, and at least one processor configured to determine a link between the CSI received and one or more instances of the CSI-RS instances based on at least one condition, and process the CSI in accordance with the determined link.

Another innovative aspect of the subject matter described in this disclosure can be implemented in a method for wireless communication by a first wireless device. The method generally includes receiving one or more instances of channel state information reference signals (CSI-RS), generating CSI based on one or more of the CSI-RS instances, determining timing for transmitting the CSI based, at least in part, on at least one condition involving the CSI-RS instances, and transmitting the CSI in accordance with the determined timing.

Another innovative aspect of the subject matter described in this disclosure can be implemented in a method for wireless communication by a second wireless device. The method generally includes transmitting one or more instances of channel state information reference signals (CSI-RS), receiving CSI from a first wireless device, generated based on one or more of the CSI-RS instances, determining a link between the CSI received and one or more instances of the CSI-RS instances based on at least one condition, and processing the CSI in accordance with the determined link.

Another innovative aspect of the subject matter described in this disclosure can be implemented in an apparatus for wireless communication by a first wireless device. The apparatus generally includes means for receiving one or more instances of channel state information reference signals (CSI-RS), means for generating CSI based on one or more of the CSI-RS instances, means for determining timing for transmitting the CSI based, at least in part, on at least one condition involving the CSI-RS instances, and means for transmitting the CSI in accordance with the determined timing.

Another innovative aspect of the subject matter described in this disclosure can be implemented in an apparatus for wireless communication by a second wireless device. The apparatus generally includes means for transmitting one or more instances of channel state information reference signals (CSI-RS), means for receiving CSI from a first wireless device, generated based on one or more of the CSI-RS instances, means for determining a link between the CSI received and one or more instances of the CSI-RS instances based on at least one condition, and means for processing the CSI in accordance with the determined link.

Another innovative aspect of the subject matter described in this disclosure can be implemented in a computer readable medium having instructions stored thereon for receiving one or more instances of channel state information reference signals (CSI-RS), generating CSI based on one or more of the CSI-RS instances, determining timing for transmitting the CSI based, at least in part, on at least one condition involving the CSI-RS instances, and transmitting the CSI in accordance with the determined timing.

Another innovative aspect of the subject matter described in this disclosure can be implemented in a computer readable medium having instructions stored thereon for transmitting one or more instances of channel state information reference signals (CSI-RS), receiving CSI from a first wireless device, generated based on one or more of the CSI-RS instances, determining a link between the CSI received and one or more instances of the CSI-RS instances based on at least one condition, and processing the CSI in accordance with the determined link.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for managing channel state information (CSI) reporting via a sidelink channel between two UEs. As will be described, the techniques presented herein allow a CSI report transmitting UE options for how to generate CSI from multiple CSI-RS instances and/or when to report the generated CSI.

The following description provides examples of sidelink CSI reporting techniques, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
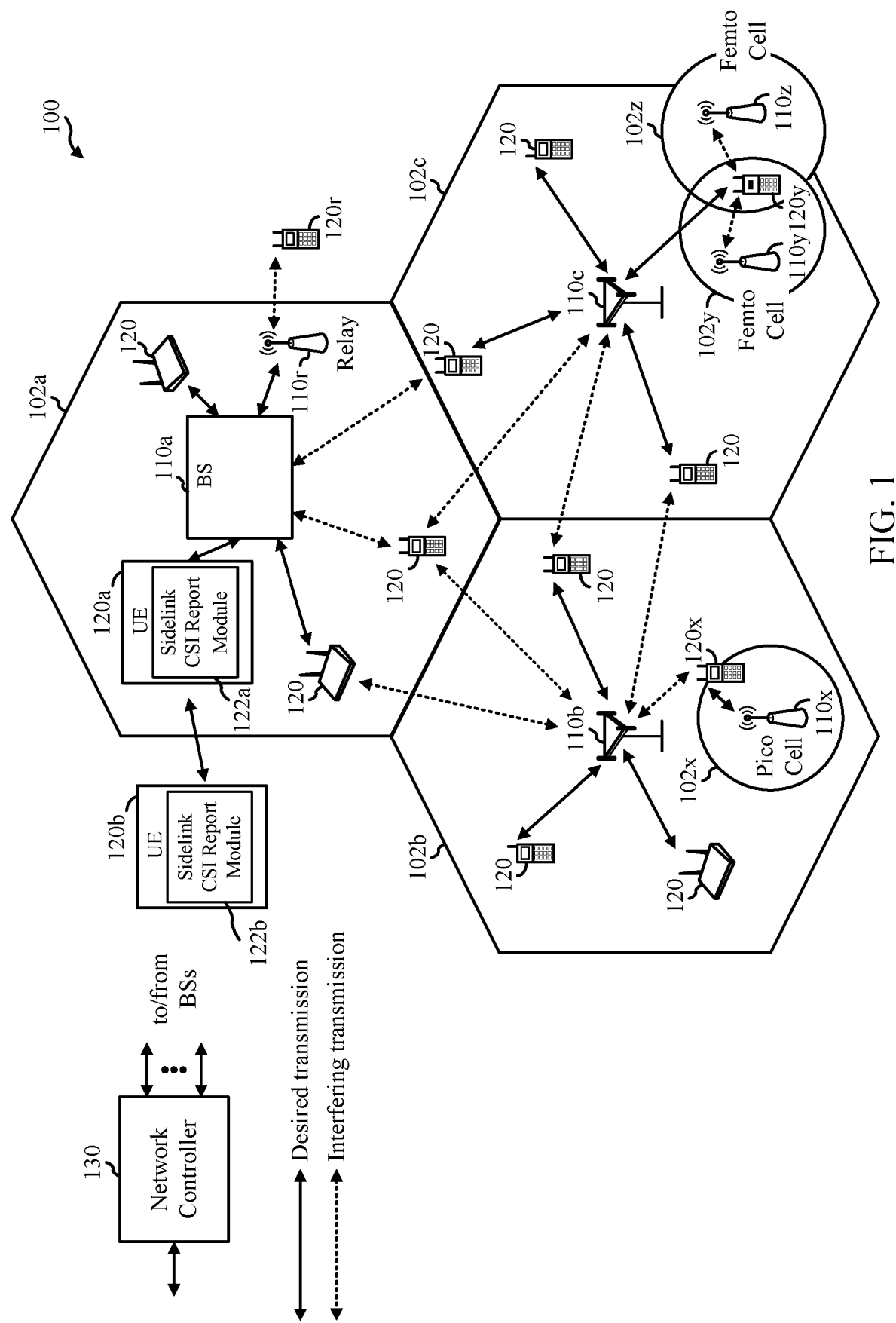
FIG. 1 shows an example wireless communication network in which some aspects of the present disclosure may be performed.

FIG. 1 illustrates an example wireless communication network 100 in which aspects of the present disclosure may be performed. For example, as shown in FIG. 1, UE 120a and/or UE 120b may include a Sidelink CSI Report Module (122a, 122b), that may be configured to perform operations 400 of FIG. 4 and/or operations 500 of FIG. 5 to manage sidelink CSI reporting as described herein.

NR access (for example, 5G NR) may support various wireless communication services, such as enhanced mobile broadband (eMBB) targeting wide bandwidth (for example, 80 MHz or beyond), millimeter wave (mmWave) targeting high carrier frequency (for example, 25 GHz or beyond), massive machine type communications MTC (mMTC) targeting non-backward compatible MTC techniques, or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same time-domain resource (for example, a slot or subframe) or frequency-domain resource (for example, component carrier).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (for example, 120x, 120y, etc.) may be dispersed throughout the wireless communication network 100, and each UE 120 may be stationary or mobile.

Wireless communication network 100 may also include relay stations (for example, relay station 110r), also referred to as relays or the like, that receive a transmission of data or other information from an upstream station (for example, a BS 110a or a UE 120r) and sends a transmission of the data or other information to a downstream station (for example, a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (for example, directly or indirectly) via wireless or wireline backhaul.

Figure 2:
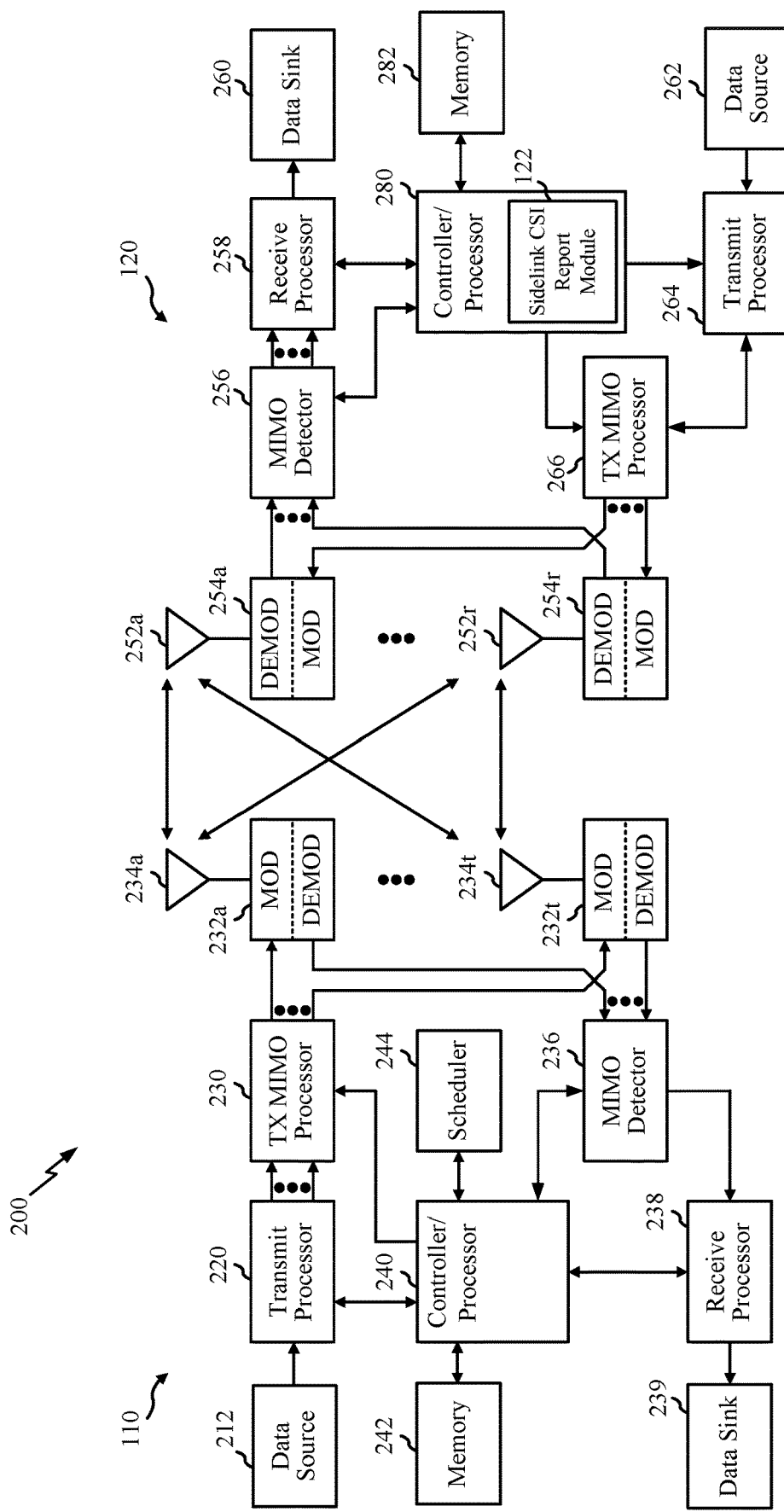
FIG. 2 shows a block diagram illustrating an example base station (BS) and an example user equipment (UE) in accordance with some aspects of the present disclosure.

FIG. 2 shows a block diagram illustrating an example base station (BS) and an example user equipment (UE) in accordance with some aspects of the present disclosure.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (for example, precoding) on the data symbols, the control symbols, or the reference symbols, if applicable, and may provide output symbol streams to the modulators (MODs) 232a-232t. Each modulator 232 may process a respective output symbol stream (for example, for OFDM, etc.) to obtain an output sample stream. Each modulator may further process (for example, convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (for example, filter, amplify, downconvert, and digitize) a respective received signal to obtain input samples. Each demodulator may further process the input samples (for example, for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (for example, demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (for example, for the physical uplink shared channel (PUSCH)) from a data source 262 and control information (for example, for the physical uplink control channel (PUCCH) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the demodulators in transceivers 254a-254r (for example, for SC-FDM, etc.), and transmitted to the BS 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the downlink or uplink.

The controller/processor 280 or other processors and modules at the UE 120 may perform or direct the execution of processes for the techniques described herein. As shown in FIG. 2, the controller/processor 280 of the UE 120 has a Sidelink CSI Report Module 122 that may be configured to configure/schedule UE 120s own CSI report (per operations 400 of FIG. 4) and/or process a sidelink CSI report from another UE (per operations 500 of FIG. 5). Although shown at the Controller/Processor, other components of the UE or BS may be used to perform the operations described herein.

Figure 3B:
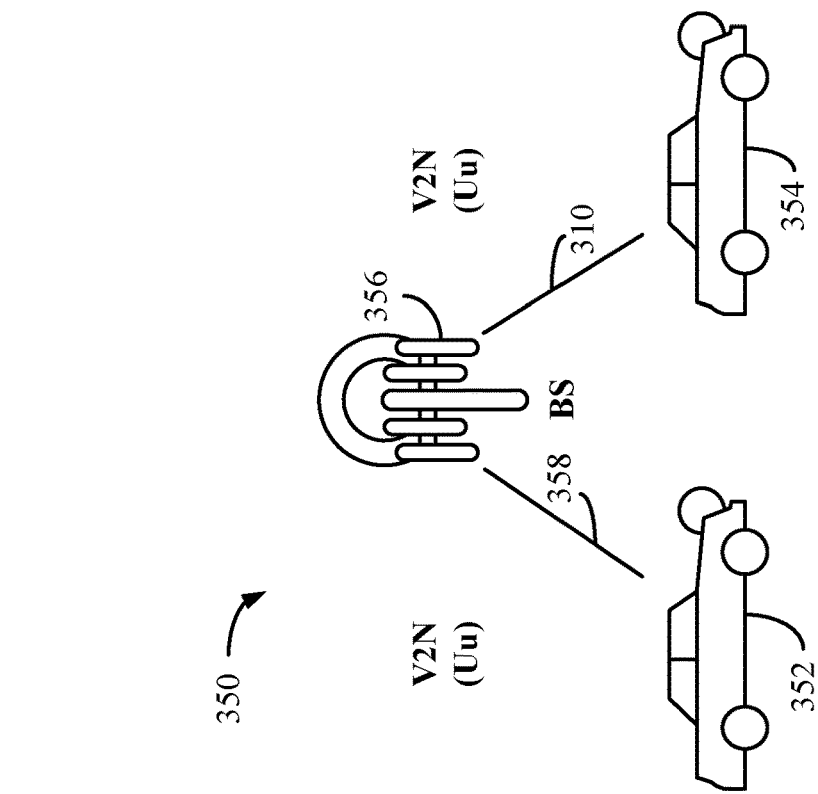
FIGS. 3A and 3B show diagrammatic representations of example vehicle to everything (V2X) systems in accordance with some aspects of the present disclosure.
Figure 3A:
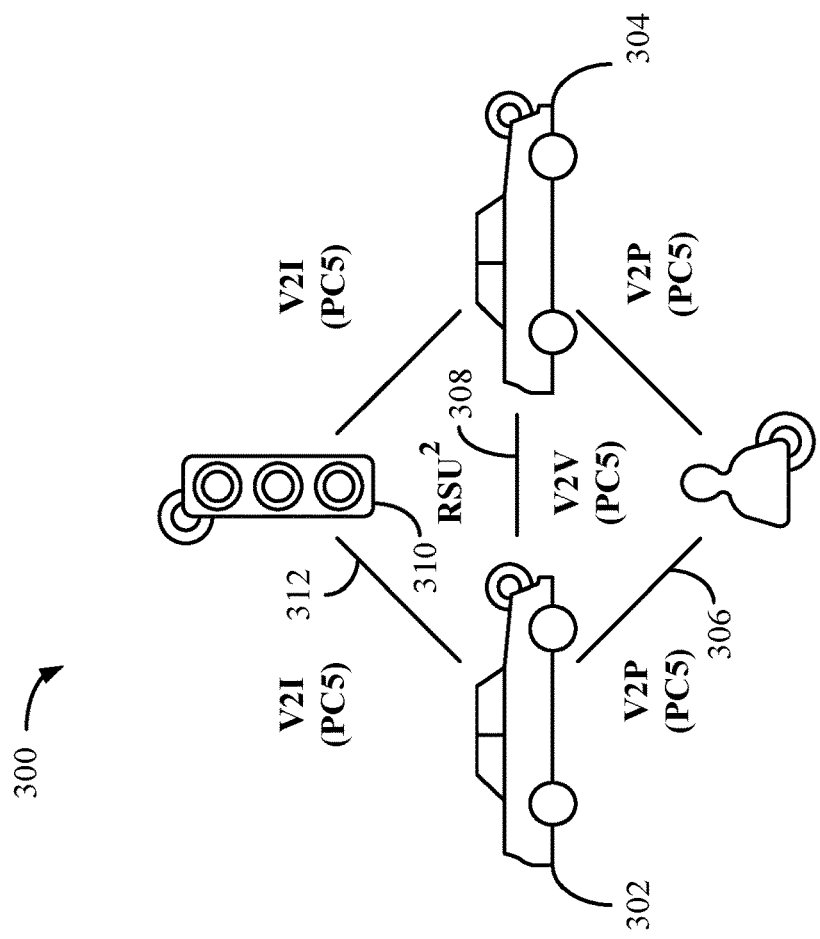

FIGS. 3A and 3B show diagrammatic representations of example vehicle to everything (V2X) systems in accordance with some aspects of the present disclosure. For example, the vehicles shown in FIGS. 3A and 3B may communicate via sidelink channels and may perform sidelink CSI reporting as described herein.

The V2X systems, provided in FIGS. 3A and 3B provide two complementary transmission modes. A first transmission mode, shown by way of example in FIG. 3A, involves direct communications (for example, also referred to as side link communications) between participants in proximity to one another in a local area. A second transmission mode, shown by way of example in FIG. 3B, involves network communications through a network, which may be implemented over a Uu interface (for example, a wireless communication interface between a radio access network (RAN) and a UE).

Referring to FIG. 3A, a V2X system 300 (for example, including vehicle to vehicle (V2V) communications) is illustrated with two vehicles 302, 304. The first transmission mode allows for direct communication between different participants in a given geographic location. As illustrated, a vehicle can have a wireless communication link 306 with an individual (V2P) (for example, via a UE) through a PC5 interface. Communications between the vehicles 302 and 304 may also occur through a PC5 interface 308. In a like manner, communication may occur from a vehicle 302 to other highway components (for example, highway component 310), such as a traffic signal or sign (V2I) through a PC5 interface 312. With respect to each communication link illustrated in FIG. 3A, two-way communication may take place between elements, therefore each element may be a transmitter and a receiver of information. The V2X system 300 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 3B shows a V2X system 350 for communication between a vehicle 352 and a vehicle 354 through a network entity 356. These network communications may occur through discrete nodes, such as a base station (for example, an eNB or gNB), that sends and receives information to and from (for example, relays information between) vehicles 352, 354. The network communications through vehicle to network (V2N) links 358 and 310 may be used, for example, for long range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks, which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as channel state information (CSI) related to a sidelink channel quality.

Example Methods and Conditions for Sidelink CSI Reporting

Aspects of the present disclosure provide apparatus, methods, processing systems, and computer readable mediums for managing channel state information (CSI) reporting via a sidelink channel between two UEs. As will be described, the techniques presented herein allow a CSI report transmitting UE options for how to generate CSI from multiple CSI-RS instances and/or when to report the generated CSI.

CSI in NR includes a variety of channel quality metrics, such as Channel Quality Indicator (CQI); Precoding Matrix Indicator (PMI), CSI-RS Resource Indicator (CRI), Strongest Layer Indication (SLI), Rank Indication (RI), and L1-RSRP (for beam management).

For V2X deployments, such as described with reference to FIGS. 3A and 3B, CSI reporting can be enabled and disabled by configuration. For flexibility, devices may be configured to report only a subset of the metrics for CSI reporting.

For example, for CSI acquisition for unicast transmissions, CQI/RI reporting may be supported and, in some cases, may be reported together. For this purpose, however, PMI reporting may not be supported. Multi-rank PSSCH transmission may be supported with limitations, for example, up to two antenna ports.

For sidelink CSI reporting, CSI may be delivered using PSSCH using the resource allocation procedure for data transmission. In such cases, the CSI may be multiplexed with data or reported in PSSCH containing CSI only.

Aspects of the present disclosure address various potential challenges presented when considering sidelink CSI reporting. For example, one potential challenge is how to link the CSI (report) transmission (from a receiver UE or Rx UE) to the CSI-RS transmission from the transmitter UE (Tx UE that transmitted the CSI-RS). The PSSCH data transmissions from the Tx UE and the Rx UE are typically not linked and may depend on their respective traffic and transmit data rate requirements that are not required to be same between the Tx/Rx UEs (or forward/backward links).

This potential challenge may be illustrated by considering an example where the Tx UE sends 2 (re)transmissions, each with CSI-RS, that are sent before a PSSCH transmission from the receiver UE that include the CSI feedback. In this scenario, it may not be clear how the Rx UE indicates the CSI-RS transmission instance for which this CSI was evaluated or whether it generated CSI based on both CSI-RS instances (e.g., whether reported metrics such as CQI and/or RI are taken as an average or other function, such as a minimum/maximum).

Certain scenarios may have more of a need for linkage between an Rx UE's CSI (report or reports) transmission and Tx UE's CSI-RS transmission instance than other scenarios. For example, for certain sidelink communications, CSI may be merely used to adapt to the large scale parameters (e.g., path loss, shadowing, rank observed over time, etc.) rather than adapt to small-scale variations (e.g., no PMI, no wideband CSI-RS or per-subband CSI feedback).

Another potential challenge is how to multiplex (piggyback) the CSI report(s) on a PSSCH transmission from Rx UE. It may be possible to include the CSI reports(s) in one or more media access control (MAC) control elements (MAC CEs) or via some other form of multiplexing.

Another potential challenge is how to deal with "stale" CSI, for example, if the Rx UE does not get a chance to transmit the CSI feedback within a given (expiration) time (latency period). This may be the case, for example, if there is no active traffic (PSSCH) present at the Rx UE for including the CSI feedback. Further, in some cases, CSI-only PSSCH (with no data bits) may not be supported) or certain conditions on which CSI-only PSSCH is triggered may not be met.

Techniques presented in the present disclosure may help address these challenges, for example, by allowing a CSI report transmitting UE options for how to generate CSI from multiple CSI-RS instances and/or when to report the generated CSI.

Figure 4:
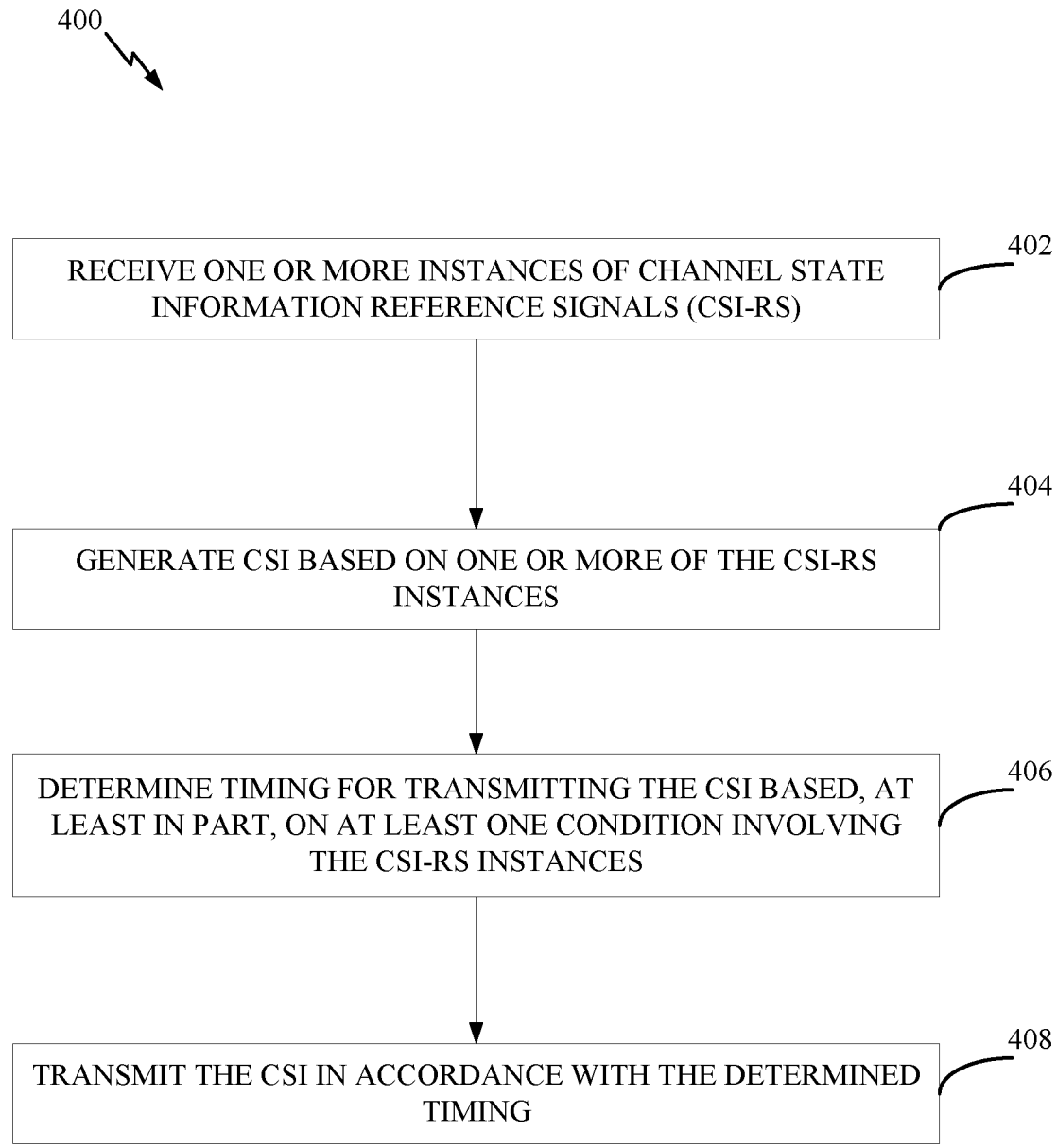
FIG. 4 illustrates example operations for wireless communication by a first wireless device in accordance with some aspects of the present disclosure.

FIG. 4 illustrates example operations 400 for wireless communication by a first wireless device in accordance with some aspects of the present disclosure. For example, operations 400 may be performed by a CSI report transmitting UE 120b of FIG. 1 (or UE B of FIG. 6) to send a sidelink CSI report to a CSI-RS transmitting UE 120a (or UE A of FIG. 6).

Operations 400 begin, at 402, by receiving one or more instances of channel state information reference signals (CSI-RS). At 404, the first wireless device generates CSI based on one or more of the CSI-RS instances. At 406, the first wireless device determines timing for transmitting the CSI based, at least in part, on at least one condition involving the CSI-RS instances. At 408, the first wireless device transmits the CSI in accordance with the determined timing.

Figure 5:
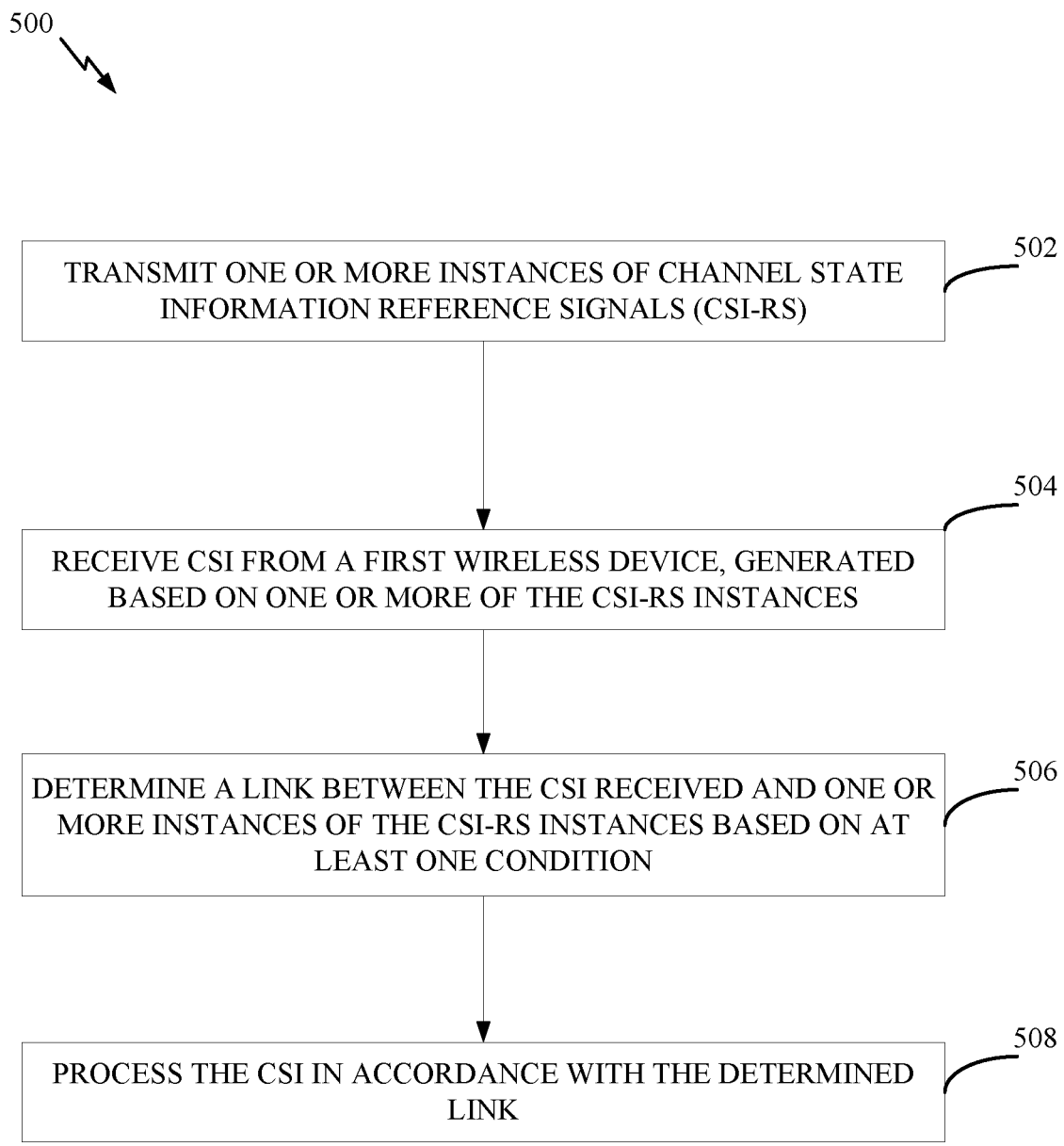
FIG. 5 illustrates example operations for wireless communication by a second wireless device in accordance with some aspects of the present disclosure.

FIG. 5 illustrates example operations 500 for wireless communication by a second wireless device in accordance with some aspects of the present disclosure. For example, operations 500 may be performed by a UE 120a of FIG. 1 (or UE B of FIG. 6) to process a sidelink CSI report sent from a UE 120b (or UE B of FIG. 6) performing operations 400.

Operations 500 begin, at 502, by transmitting one or more instances of channel state information reference signals (CSI-RS). At 504, the second wireless device receives CSI from a first wireless device, generated based on one or more of the CSI-RS instances. At 506, the second wireless device determines a link between the CSI received and one or more instances of the CSI-RS instances based on at least one condition. At 508, the second wireless device processes the CSI in accordance with the determined link.

Figure 6:
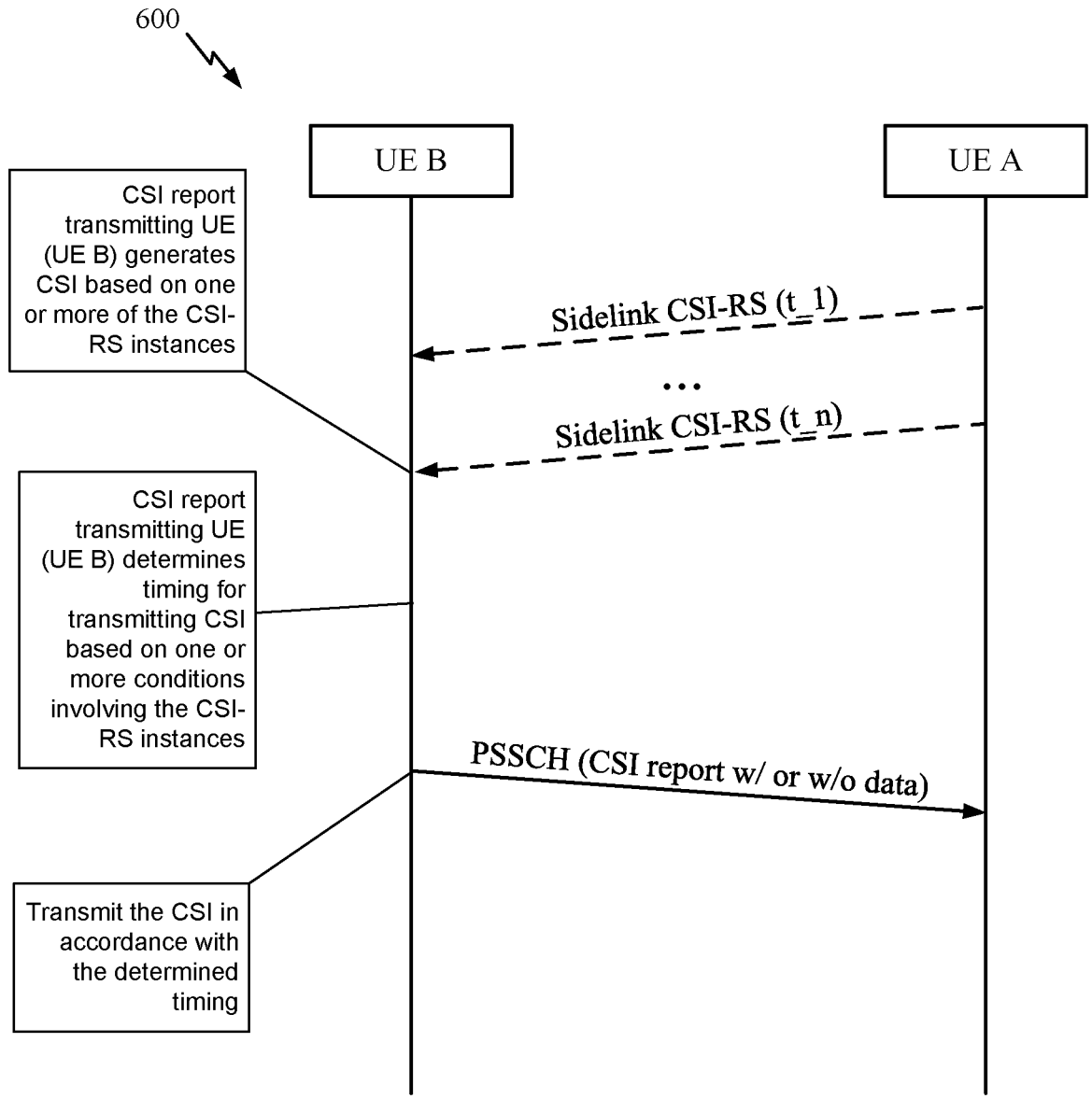
FIG. 6 shows a call flow diagram illustrating an example process for wireless communication in accordance with some aspects of the present disclosure.

Operations 400 and 500 of FIGS. 4 and 5 may be understood with reference to the call flow diagram of FIG. 6, which shows a UE B that generates and transmits a CSI report to a CSI-RS transmitting UE A, in accordance with aspects described herein.

As illustrated, UE A transmits one or more instances of sidelink CSI-RS (at time instances t_1 ... t_n). As illustrated, UE_B generates CSI based on one or more of the CSI-RS instances.

In some cases, UE B also determines timing (e.g., a time instance t_m) for transmitting the CSI based on one or more conditions involving the CSI-RS instances. UE B then transmits the CSI in accordance with the determined timing (e.g., at t_m). As illustrated, the CSI report(s) may be included in a CSI-only PSSCH or piggybacked on a data transmission at the time instance t_m.

As long as UE A knows the conditions on which UE B bases the CSI and/or the timing, UE A may be able to determine a link between the CSI report(s) received and the CSI-RS instances it transmitted. The present disclosure provides various proposals for transmitting the sidelink CSI, based on different conditions.

According to a first proposal (Proposal 1) the UE sending the CSI feedback (UE A) may determine a time instance (t_m) to the transmitter UE, based on one or more of the CSI-RS transmissions (e.g., received at t1, t2, . . . tn). The content of the CSI may vary. In some cases, the CSI may include at least CQI and RI. In some cases, CQI and RI may always be reported together. In some cases, UE A may determine the time instance t_m to transmit the CSI feedback to UE B as a function of the one or more determined CSI (or CSI-RS transmissions).

In some cases, the Rx UE (UE A) may be additionally configured with a parameter (max_time_delay_CSI) that indicates a maximum time delay between the reception of the CSI-RS from the Tx UE (UE B), and the CSI transmission instance (t_m). In some cases, this max_time_delay_CSI may be part of the RRC (pre)configuration. In some cases, such a parameter (latency bound) may be maintained for each sidelink (PC5) RRC connection.

In some cases, if the time between reception of a CSI-RS (at time t_n) and the potential data transmission from the Rx UE (UE B) to the Tx UE (at time t_m) exceeds the max_time_delay_CSI configured (which may be considered a latency bound), then the Rx UE does not include the CSI in that data transmission at t_m (e.g., the SL-CSI reporting may be considered canceled in this case).

A UE may support various combination of CSI-RS reporting configurations. In some cases, a UE may be configured to support various aperiodic CSI-RS configurations that are triggered (activated) in various manners, such as via an SCI with a CSI request field. In such cases, the sidelink CSI-RS may be transmitted in resource blocks used for a PSSCH associated with the CSI triggering the report. The UE may be configured with a CSI reporting latency bound, as noted above.

In some cases, the Rx UE triggers transmission of CSI piggybacked on a data channel (e.g., PSSCH) without the presence of any data bits (e.g., transmission of CSI on PSSCH without SL-SCH) corresponding to a CSI-RS reception from a Tx UE at time instance (t_n). In other words, if no PSSCH transmission to the Tx UE occurs (or is not expected) until t_n+max_time_delay_CSI, the Rx UE may trigger a CSI-only transmission. In some cases, the Rx UE may trigger this transmission with sufficient time to account for processing. For example, the Rx UE may trigger the transmission at time (t_n+max_time_delay_CSI-X_slots), where X_slots is the time needed to prepare the PSSCH transmission with CSI at the Rx UE (and may also account for time needed for securing a resource for transmission).

In some cases, if multiple CSI-RS instances are received at time slots (t1, t2, . . . tn) before corresponding CSI feedback to be sent at time t_m, the UE may determine exactly how to calculate the CSI according to various options.

For example, in some cases, the Rx UE may determine the CSI to feedback based only on the last CSI-RS received. In some cases, the CSI may be determined based on CSI-RS within a time window, for example, based on the slots (t1, t2, . . . tn) greater than t_m-max_time_delay_CSI.

In some cases, one or more of the parameters (e.g., CQI and/or RI) included in the CSI feedback based on the slots of multiple CSI-RS may be calculated as follows. In some cases, CQI signaled in the CSI feedback may be calculated as the mean CQI estimated over the CSI-RS instances. In some cases, CQI signaled may be calculated as a minimum CQI estimated over the CSI-RS instances or as a maximum CQI estimated over the CSI-RS instances. In some cases, CQI signaled may be calculated as a given statistic (as configured, e.g., 75th percentile) for CQI estimated over the CSI-RS instances.

In some cases, RI signaled in the CSI feedback may be calculated as a minimum RI estimated over the CSI-RS instances or as a maximum RI estimated over the CSI-RS instances.

In some case, each individual CSI report (for a given CSI-RS transmission) may be sent individually (without combining). In such cases, the number of CSI reports may be indicated in the CSI transmissions (e.g., the Rx UE may indicate n reports and provide CSI reports for t_1, t_2, . . . t_n).

In some cases, the one or more CSI reports may be multiplexed with PSSCH and transmitted as MAC_CE. In such cases, each report may be conveyed in an individual MAC_CE or a single MAC_CE may contain multiple (or all) of the reports.

In some cases, the one or more CSI reports may be bit multiplexed with PSSCH (similar to UCI on PUSCH). In such cases, the Rx UE may send (e.g., via SCI) control information that indicates the presence of the report(s), the size, and/or number of the report(s).

In some cases, the one or more CSI reports may be sent using resource element (RE) multiplexing, rather than bit multiplexing. For example, the CSI reports may be sent as a control channel (CCH) stage 2 control message and multiplexed with the PSSCH (assuming control stage 2 is not bit-multiplexed with PSSCH, but is RE multiplexed as a separate physical channel with PSSCH). Stage 2 control generally refers to a two part control protocol, for example, where a first stage message provides information regarding resource allocation and allows for decoding of a second stage message. The second stage message may have a format (and include information) specific to a type of message (e.g., unicast, broadcast, or groupcast).

As described herein, a CSI-transmitting UE receiving multiple instances of CSI-RS may determine how to generate and/or when to send CSI based on one or more conditions.

The techniques described herein may be used for various wireless communication technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (for example, a smart ring, a smart bracelet, etc.), an entertainment device (for example, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

Some wireless networks (for example, LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (for example, 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (for example, 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. An apparatus for wireless communication by a first wireless device, the apparatus comprising:
a receiver configured to receive one or more instances of channel state information reference signals (CSI-RS);
at least one processor configured to:
generate one or more CSI reports for one or more of the CSI-RS instances; and
determine whether a time between reception of a first CSI-RS instance of the one or more CSI-RS instances and a potential data transmission from the first wireless device is less than or equal to a maximum time delay; and
a transmitter configured to:
transmit a first CSI report, of the one or more CSI reports, for the first CSI-RS instance, being multiplexed with data in a physical sidelink shared channel (PSSCH) transmission when the time between the reception of the first CSI-RS instance and the potential data transmission is less than or equal to the maximum time delay; and
transmit the first CSI report, of the one or more CSI reports, for the first CSI-RS instance, without multiplexing the first CSI report with the data in the PSSCH transmission when the time between the reception of the first CSI-RS instance and the potential data transmission is greater than the maximum time delay.

2. The apparatus of claim 1, wherein the one or more CSI reports comprises at least a channel quality indicator (CQI) and a rank indicator (RI).

3. The apparatus of claim 1, wherein the receiver is further configured to receive radio resource control (RRC) signaling indicating a value of the maximum time delay.

4. The apparatus of claim 1, wherein the first wireless device is configured to trigger the transmission of the one or more CSI reports on the PSSCH transmission with time for the first wireless device to prepare the PSSCH transmission with the one or more CSI reports.

5. The apparatus of claim 1, wherein the at least one processor is configured to generate the one or more CSI reports for the one or more of the CSI-RS instances by:
generating the one or more CSI reports for only a last received CSI-RS; or
generating the one or more CSI reports for the one or more CSI-RS instances that are received within a window.

6. The apparatus of claim 5, wherein the at least one processor is configured to generate the one or more CSI reports for the one or more of the CSI-RS instances by generating the one or more CSI reports for the one or more CSI-RS instances that are received within a window, and wherein the window is based on a maximum time delay between reception of a CSI-RS instance of the CSI-RS instances and a transmission instance of a corresponding CSI report of the one or more CSI reports.

7. The apparatus of claim 1, wherein the at least one processor is configured to generate the one or more CSI reports for the one or more of the CSI-RS instances by generating a channel quality indicator (CQI):
as a mean CQI estimated over the one or more CSI-RS instances;
as a minimum CQI estimated over the one or more CSI-RS instances;
as a maximum CQI estimated over the one or more CSI-RS instances; or
relative to a given statistic for CQI estimated over the one or more CSI-RS instances.

8. The apparatus of claim 1, wherein the at least one processor is configured to generate the one or more CSI reports for the one or more of the CSI-RS instances by generating a rank indicator (RI) as:
a minimum RI estimated over the one or more CSI-RS instances; or
a maximum RI estimated over the one or more CSI-RS instances.

9. The apparatus of claim 1, wherein:
the at least one processor is configured to generate the one or more CSI reports for the one or more of the CSI-RS instances by generating an individual CSI report for each of the one or more CSI-RS instances; and
the transmitter is configured to transmit the individual CSI report along with an indication of a quantity of the individual CSI reports transmitted.

10. The apparatus of claim 1, wherein:
the at least one processor is configured to generate the one or more CSI reports for the one or more of the CSI-RS instances by generating an individual CSI report for each of the one or more CSI-RS instances; and
the transmitter is configured to transmit, in at least one medium access control (MAC) control element (MAC CE), the individual CSI report multiplexed with the data.

11. The apparatus of claim 10, wherein:
each CSI report of the one or more CSI reports is included in an individual MAC CE; or
a single MAC CE contains all of the CSI reports.

12. The apparatus of claim 1, wherein when the time between the reception of the first CSI-RS instance and the potential data transmission is less than or equal to the maximum time delay, the one or more CSI reports are bit multiplexed with the data.

13. The apparatus of claim 1, wherein when the time between the reception of the first CSI-RS instance and the potential data transmission is less than or equal to the maximum time delay, the one or more CSI reports are resource element (RE) multiplexed with the data.

14. A method for wireless communication by a first wireless device, comprising:
receiving one or more instances of channel state information reference signals (CSI-RS);
generating one or more CSI reports for one or more of the CSI-RS instances;
determining whether a time between reception of a first CSI-RS instance of the one or more CSI-RS instances and a potential data transmission from the first wireless device is less than or equal to a maximum time delay;
transmitting a first CSI report, of the one or more CSI reports, for the first CSI-RS instance, being multiplexed with data in a physical sidelink shared channel (PSSCH) transmission when the time between the reception of the first CSI-RS instance and the potential data transmission is less than or equal to the maximum time delay; and transmitting the first CSI report, of the one or more CSI reports, for the first CSI-RS instance, without multiplexing the first CSI report with the data in the PSSCH transmission when the time between the reception of the first CSI-RS instance and the potential data transmission is greater than the maximum time delay.

15. An apparatus for wireless communication by a first wireless device, the apparatus comprising:

means for receiving one or more instances of channel state information reference signals (CSI-RS);

means for generating one or more CSI reports for one or more of the CSI-RS instances;

means for determining whether a time between reception of a first CSI-RS instance of the one or more CSI-RS instances and a potential data transmission from the first wireless device to a second wireless device is less than or equal to a maximum time delay;

means for transmitting a first CSI report, of the one or more CSI reports, for the first CSI-RS instance, being multiplexed with data in a physical sidelink shared channel (PSSCH) transmission when the time between the reception of the first CSI-RS instance and the potential data transmission is less than or equal to the maximum time delay; and means for transmitting the first CSI report, of the one or more CSI reports, for the first CSI-RS instance, without multiplexing the first CSI report with the data in the PSSCH transmission when the time between the reception of the first CSI-RS instance and the potential data transmission is greater than the maximum time delay.

16. A non-transitory computer readable medium having instructions stored thereon that, when executed by one or more processors, cause an apparatus to:

receive one or more instances of channel state information reference signals (CSI-RS);

generate one or more CSI reports for one or more of the CSI-RS instances;

determine whether a time between reception of a first CSI-RS instance of the one or more CSI-RS instances and a potential data transmission is less than or equal to a maximum time delay;

transmit a first CSI report, of the one or more CSI reports, for the first CSI-RS instance, being multiplexed with data in a physical sidelink shared channel (PSSCH) transmission when the time between the reception of the first CSI-RS instance and the potential data transmission is less than or equal to the maximum time delay; and transmit the first CSI report, of the one or more CSI reports, for the first CSI-RS instance, without multiplexing the first CSI report with the data in the PSSCH transmission when the time between the reception of the first CSI-RS instance and the potential data transmission is greater than the maximum time delay.

17. The apparatus of claim 1, wherein the maximum time delay is based on a maximum time delay between reception of a CSI-RS instance of the CSI-RS instances and a transmission instance of a corresponding CSI report of the one or more CSI reports.

18. The method of claim 14, wherein the maximum time delay is based on a maximum time delay between reception of a CSI-RS instance of the CSI-RS instances and a transmission instance of a corresponding CSI report of the one or more CSI reports.

19. The apparatus of claim 15, wherein the maximum time delay is based on a maximum time delay between reception of a CSI-RS instance of the CSI-RS instances and a transmission instance of a corresponding CSI report of the one or more CSI reports.

20. The non-transitory computer readable medium of claim 16, wherein the maximum time delay is based on a maximum time delay between reception of a CSI-RS instance of the CSI-RS instances and a transmission instance of a corresponding CSI report of the one or more CSI reports.

* * * * *